(12) United States Patent
Kumazaki

(10) Patent No.: US 12,491,916 B2
(45) Date of Patent: Dec. 9, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/540,974

(22) Filed: Dec. 15, 2023

(65) Prior Publication Data

US 2024/0286651 A1 Aug. 29, 2024

(30) Foreign Application Priority Data

Feb. 28, 2023 (JP) .................. 2023-029641

(51) Int. Cl.
*B60W 60/00* (2020.01)
*B60W 40/06* (2012.01)
(Continued)

(52) U.S. Cl.
CPC ........ *B60W 60/0053* (2020.02); *B60W 40/06* (2013.01); *B60W 40/105* (2013.01);
(Continued)

(58) Field of Classification Search
CPC ..... B60W 2050/143; B60W 2050/146; B60W 2420/403; B60W 2520/10; B60W 2540/223; B60W 2552/15; B60W 2552/30; B60W 2552/53; B60W 2554/801; B60W 2555/60; B60W 2556/20; B60W 2556/25; B60W 2556/40; B60W 2556/50; B60W 40/06; B60W 40/105; B60W 50/14; B60W 50/16; B60W 60/0053; B60W 60/0059
See application file for complete search history.

(56) References Cited

U.S. PATENT DOCUMENTS 11,685,402 B2 * 6/2023 Lee ................... B60W 60/0027
 701/27
2018/0167551 A1 * 6/2018 Koravadi ............... H04N 23/90
(Continued)

FOREIGN PATENT DOCUMENTS

JP 2020-104802 A 7/2020
JP 2021-149178 A 9/2021
(Continued)

*Primary Examiner* — Babar Sarwar
(74) *Attorney, Agent, or Firm* — Oliff PLC

(57) ABSTRACT

A vehicle controller includes a memory configure to store a first map representing information on a road and a second map representing information on the road less accurately than the first map; and a processor configured to determine whether an involvement requirement for requesting a driver of a vehicle to be involved in driving the vehicle is satisfied, and give notification of a request for involvement in driving via a notification device provided in the vehicle interior when the involvement requirement is satisfied. The processor makes the involvement requirement less strict when autonomous driving control of the vehicle is based on the second map than when autonomous driving control of the vehicle is based on the first map.

9 Claims, 7 Drawing Sheets

(51) Int. Cl.
  *B60W 40/105* (2012.01)
  *B60W 50/14* (2020.01)
  *B60W 50/16* (2020.01)

(52) U.S. Cl.
  CPC ....... *B60W 50/16* (2013.01); *B60W 2050/143* (2013.01); *B60W 2050/146* (2013.01); *B60W 2552/15* (2020.02); *B60W 2552/30* (2020.02); *B60W 2555/60* (2020.02); *B60W 2556/20* (2020.02); *B60W 2556/40* (2020.02)

(56) References Cited

U.S. PATENT DOCUMENTS

| | | | | |
|---|---|---|---|---|
| 2018/0292833 | A1* | 10/2018 | You | G05D 1/0212 |
| 2020/0110422 | A1* | 4/2020 | Takamatsu | B60W 60/0055 |
| 2020/0207346 | A1* | 7/2020 | Tsuji | B60W 30/12 |
| 2021/0094581 | A1* | 4/2021 | Lee | B60W 30/14 |
| 2021/0284234 | A1* | 9/2021 | Kokaki | B60W 50/14 |
| 2021/0362726 | A1* | 11/2021 | Dingli | G06V 20/64 |
| 2022/0203983 | A1* | 6/2022 | Saito | B60T 7/22 |
| 2022/0227398 | A1* | 7/2022 | Shinoda | B60W 60/0051 |
| 2022/0404828 | A1* | 12/2022 | Carroll | G05D 1/0077 |
| 2023/0282004 | A1* | 9/2023 | Yu | G08G 1/096791 |
| | | | | 382/104 |
| 2024/0051549 | A1* | 2/2024 | McGrory | B60W 40/105 |
| 2024/0166210 | A1* | 5/2024 | Kato | B60W 30/18163 |
| 2024/0257636 | A1* | 8/2024 | Nelapati | G08G 1/0145 |

FOREIGN PATENT DOCUMENTS

| | | | | |
|---|---|---|---|---|
| WO | WO-2018189843 | A1 * | 10/2018 | ........ G01C 21/3407 |
| WO | WO-2020230300 | A1 * | 11/2020 | ........... B60W 30/16 |

\* cited by examiner

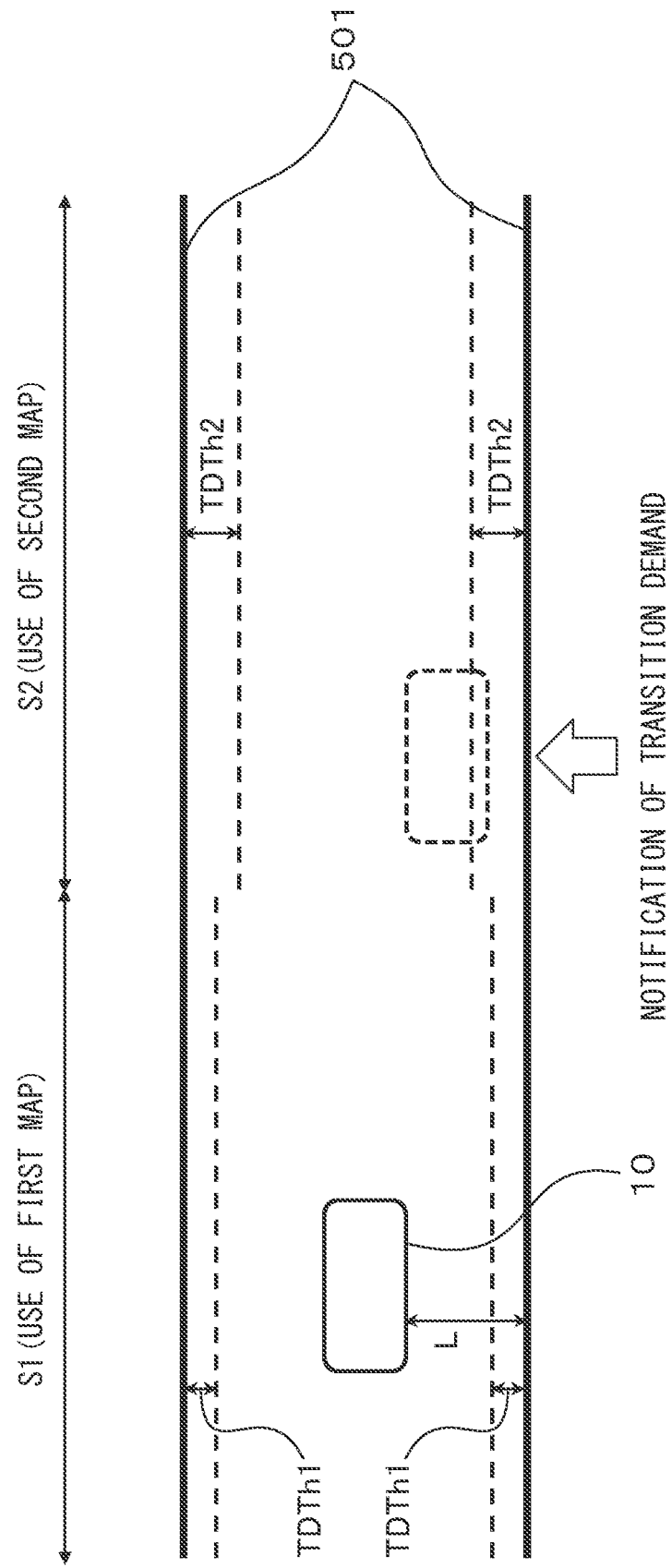

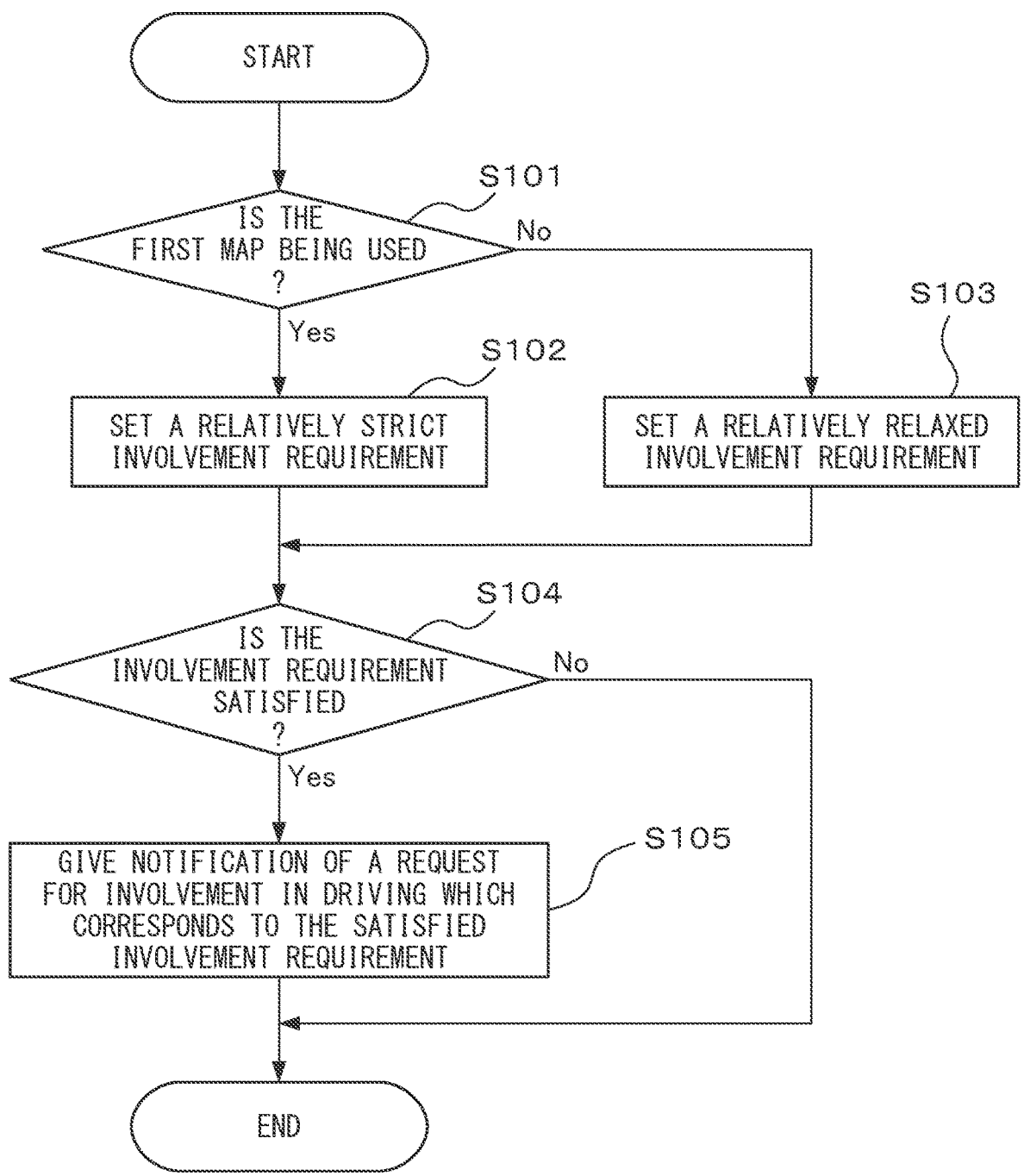

VEHICLE CONTROLLER, METHOD, AND COMPUTER PROGRAM FOR VEHICLE CONTROL

FIELD

The present invention relates to a vehicle controller, a method, and a computer program for vehicle control.

BACKGROUND

A technique to execute autonomous driving control of a vehicle by referring to map information has been proposed (see International Publication WO2018/189843A).

A method for controlling driving disclosed in WO2018/189843A includes setting first driving control when a first route included in a first map including identifying information on travel lanes is being traveled in a route to a destination; and setting second driving control, of which the level of autonomous driving is lower than that of the first driving control, when a second route included in a second map that does not include identifying information on travel lanes is being traveled in the route to the destination. The method further includes making a driving plan for a vehicle to travel along the first or second route according to the set driving control.

SUMMARY

If the accuracy of information on a road represented in a map used for autonomous driving control of a vehicle is insufficient, the vehicle may make unstable motion, e.g., the vehicle may deviate from a lane being traveled. This may result in the driver feeling uneasy.

It is an object of the present invention to provide a vehicle controller that can prevent a driver feeling uneasy regardless of a map used for travel control of a vehicle.

According to an embodiment, a vehicle controller is provided. The vehicle controller includes a memory configured to store a first map representing information on a road and a second map representing information on the road less accurately than the first map; and a processor configured to: determine whether an involvement requirement for requesting a driver of a vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a motion sensor configured to detect motion of the vehicle, or the position of the vehicle, when the vehicle is under autonomous driving control, and give notification of a request for involvement in driving via a notification device provided in the interior of the vehicle when the involvement requirement is satisfied. The processor makes the involvement requirement less strict when autonomous driving control of the vehicle is based on the second map than when autonomous driving control of the vehicle is based on the first map.

The processor of the vehicle controller preferably measures a lateral distance between a lane line demarcating a lane being traveled by the vehicle and the vehicle, based on the exterior sensor signal, and determines that the involvement requirement is satisfied, when the lateral distance falls below a predetermined distance threshold; and makes the distance threshold greater when autonomous driving control of the vehicle is based on the second map than when autonomous driving control of the vehicle is based on the first map.

In this case, the processor preferably increases the distance threshold as the degree of inconsistency between the information on the road represented in the first map and the information on the road represented in the second map increases in a section where autonomous driving control of the vehicle is based on the second map.

The processor preferably determines that the involvement requirement is satisfied, when the speed of the vehicle indicated by the vehicle motion signal is greater than a regulation speed of a road being traveled by the vehicle by more than a predetermined speed threshold; and sets the speed threshold to a lower value when autonomous driving control of the vehicle is based on the second map than when autonomous driving control of the vehicle is based on the first map.

The processor preferably determines that the involvement requirement is satisfied, when a regulation speed of a road being traveled by the vehicle is less than a predetermined speed; and sets the predetermined speed to a higher value when autonomous driving control of the vehicle is based on the second map than when autonomous driving control of the vehicle is based on the first map.

The processor preferably determines that the involvement requirement is satisfied, when the radius of curvature of a curve in a section being traveled by the vehicle or extending to a predetermined distance away is less than a predetermined curvature radius threshold; and sets the curvature radius threshold to a higher value when autonomous driving control of the vehicle is based on the second map than when autonomous driving control of the vehicle is based on the first map.

The processor preferably determines that the involvement requirement is satisfied, when the gradient of a road in a section being traveled by the vehicle or extending to a predetermined distance away is not less than a predetermined gradient threshold; and sets the gradient threshold to a lower value when autonomous driving control of the vehicle is based on the second map than when autonomous driving control of the vehicle is based on the first map.

According to another embodiment, a method for vehicle control is provided. The method includes determining whether an involvement requirement for requesting a driver of a vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a vehicle motion sensor configured to detect motion of the vehicle, or the position of the vehicle, when the vehicle is under autonomous driving control; and giving notification of a request for involvement in driving via a notification device provided in the interior of the vehicle when the involvement requirement is satisfied. Determining whether the involvement requirement is satisfied includes making the involvement requirement stricter when autonomous driving control of the vehicle is based on a first map representing information on a road than when autonomous driving control of the vehicle is based on a second map representing information on the road less accurately than the first map.

According to still another embodiment, a non-transitory recording medium that stores a computer program for vehicle control is provided. The computer program includes instructions causing a processor mounted on a vehicle to execute a process including determining whether an involvement requirement for requesting a driver of the vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a vehicle motion sensor configured to detect motion of the vehicle, or the position of the vehicle, when the vehicle is under autonomous driving control; and giving notification of a request for involvement in driving via a notification device provided in the interior of the vehicle when the involvement requirement is satisfied. Determining whether the involvement requirement is satisfied includes making the involvement requirement stricter when autonomous driving control of the vehicle is based on a first map representing information on a road than when autonomous driving control of the vehicle is based on a second map representing information on the road less accurately than the first map.

The vehicle controller according to the present disclosure has an advantageous effect of being able to prevent a driver feeling uneasy regardless of a map used for travel control of a vehicle.

BRIEF DESCRIPTION OF DRAWINGS

FIG. 5 illustrates an example of a transition demand threshold for the case where a first map is used for travel control and a transition demand threshold for the case where a second map is used for travel control.

FIG. 6 is an operation flowchart of the vehicle control process.

DESCRIPTION OF EMBODIMENTS

Figure 1:
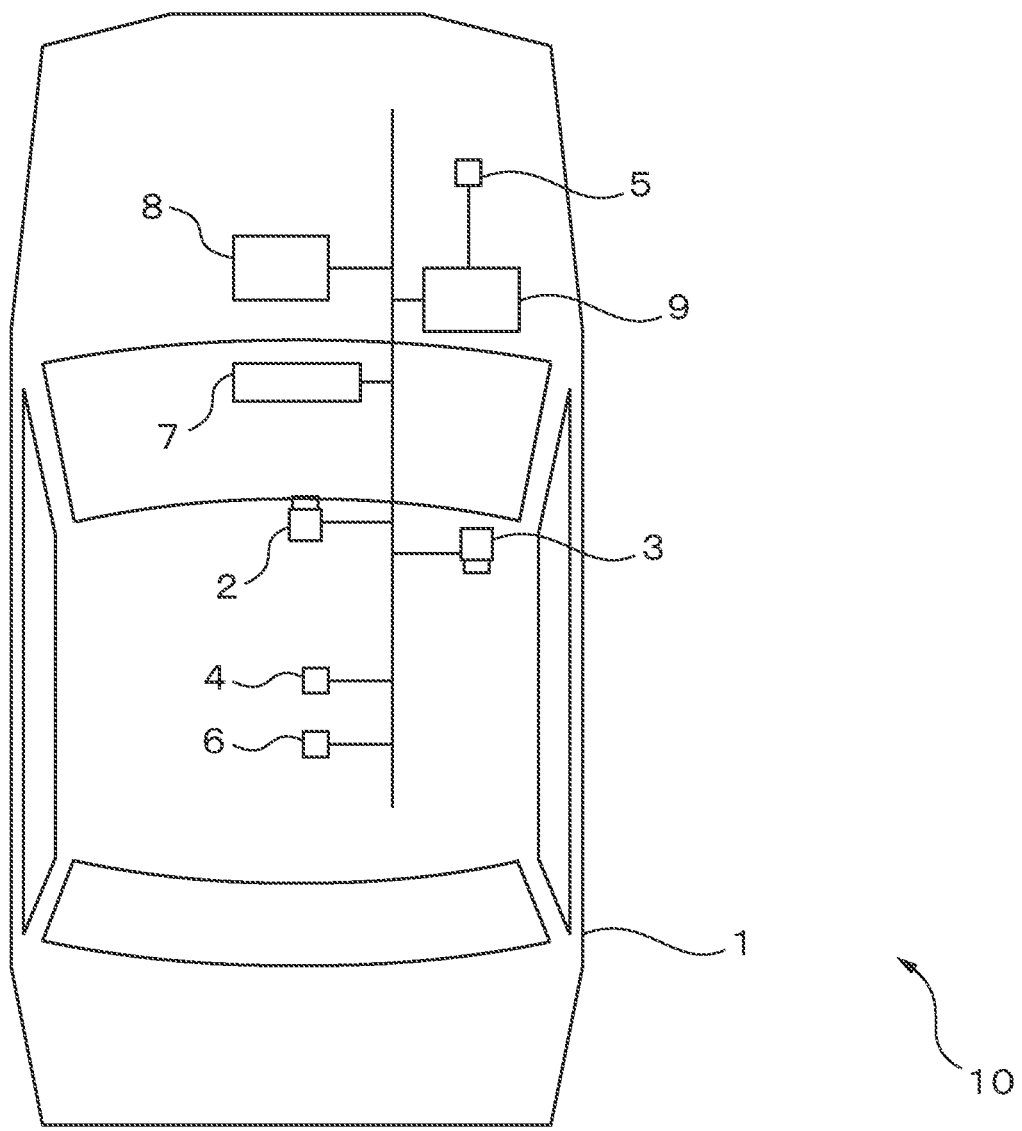
FIG. 1 schematically illustrates the configuration of a vehicle control system equipped with a vehicle controller.

A vehicle controller, a method for vehicle control executed by the vehicle controller, and a computer program for vehicle control will now be described with reference to the attached drawings. The vehicle controller executes autonomous driving control of travel of a vehicle, using a first map representing information on a road or a second map representing information on the road less accurately than the first map. More specifically, the vehicle controller determines whether an involvement requirement for requesting a driver of the vehicle to be involved in driving the vehicle is satisfied, and gives notification of a request for involvement in driving via a notification device provided in the vehicle interior when it is determined that the involvement requirement is satisfied. The vehicle controller makes the involvement requirement less strict when autonomous driving control of the vehicle is based on the second map than when autonomous driving control of the vehicle is based on the first map.

In the present embodiment, the two maps each include information used for travel control of the vehicle, e.g., information indicating the types of features, such as road markings including lane lines, curbstones, signposts, and roadside signboards, and information indicating the positions of these features, as the information on a road.

Of the two maps, the first map representing information on a road more accurately is preferably set as a map used normally. This enables controlling travel of the vehicle more appropriately. It is assumed that information on a road represented in a map is more accurate as the error in the position of a feature on or around the road represented in the map is smaller or the degree of reliability of the type and the presence or absence of the feature is higher. Thus the accuracy of the position of a feature and the degree of reliability of the type and the presence or absence of the feature in a road section unchanged after the last update of the first and second maps are higher in the first map than in the second map. In the present embodiment, the timing of update of a map refers to that of update of information on a road represented in the map. For example, in the case where a map server that manages a map or delivers a map to vehicles updates information on a predetermined road section in the first map at a first date and time, the first date and time is the timing of update.

The second map is preferably updated more frequently than the first map. This may result in, for example, the timing of the last update of the second map being later than construction in a predetermined road section, even if the first map is last updated before the construction in the predetermined road section and thus does not represent correct information on the predetermined road section. For this reason, the second map may represent correct information on the predetermined road section. Thus the use of the first and second maps for different purposes enables the vehicle controller to control travel of the vehicle appropriately.

However, travel motion of the vehicle is more likely to be unstable when the second map is used for travel control than when the first map is used for travel control. For example, when the second map is used for travel control, the vehicle is likely to deviate from a lane being traveled or to approach a lane line demarcating the lane too much. Thus the vehicle controller relaxes the involvement requirement when autonomous driving control of the vehicle is based on the second map, enabling requesting the driver to be involved in driving before travel motion of the vehicle becomes unstable.

Figure 2:
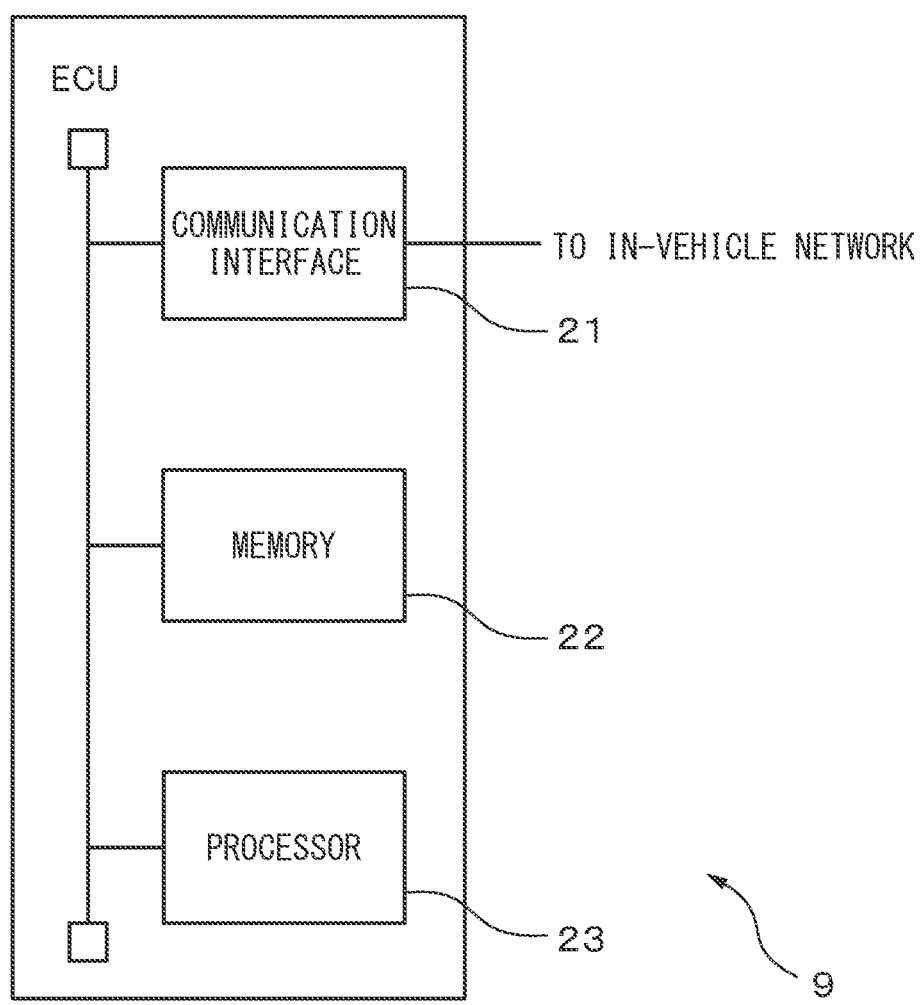
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, a vehicle control system 1, which is mounted on a host vehicle 10 and controls the vehicle 10, includes a camera 2, a driver monitoring camera 3, a GPS receiver 4, a motion sensor 5, a wireless communication terminal 6, a notification device 7, a storage device 8, and an electronic control unit (ECU) 9, which is an example of the vehicle controller. The camera 2, the driver monitoring camera 3, the GPS receiver 4, the wireless communication terminal 6, the notification device 7, and the storage device 8 are communicably connected to the ECU 9 via an in-vehicle network conforming to a standard such as a controller area network. The motion sensor 5 is also communicably connected to the ECU 9. The vehicle control system 1 may further include a range sensor (not illustrated) that measures the distances from the vehicle 10 to objects around the vehicle 10, such as LiDAR or radar. The vehicle control system 1 may further include a navigation device (not illustrated) for searching for a route to a destination.

The camera 2, which is an example of the exterior sensor, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes a picture of a region in front of the vehicle 10 every predetermined capturing period (e.g., $\frac{1}{30}$ to $\frac{1}{10}$ seconds), and generates images representing this region. Each image obtained by the camera 2 is an example of an exterior sensor signal representing conditions around the vehicle 10. The vehicle 10 may include multiple cameras taking pictures in different orientations or having different focal lengths.

Every time an image is generated, the camera 2 outputs the generated image to the ECU 9 via the in-vehicle network.

The driver monitoring camera 3, which is an example of the interior sensor, includes a two-dimensional detector constructed from an array of optoelectronic transducers, such as CCD or C-MOS, having sensitivity to visible or infrared light and a focusing optical system that forms an image of a target region on the two-dimensional detector, similarly to the camera 2. The driver monitoring camera 3 may further include a light source, such as an infrared LED, for illuminating the driver. The driver monitoring camera 3 is mounted, for example, on or near an instrument panel and oriented to the driver so that the head of the driver sitting on the driver's seat of the vehicle 10 may be included in the target region, i.e., so that pictures of the driver's head can be taken. The driver monitoring camera 3 takes pictures of the driver every predetermined capturing period (e.g., $\frac{1}{30}$ to $\frac{1}{10}$ seconds), and generates images representing the driver (hereafter "driver images"). Each driver image obtained by the driver monitoring camera 3 is an example of an interior sensor signal representing conditions in the interior of the vehicle 10, and may be a color or grayscale image. Every time a driver image is generated, the driver monitoring camera 3 outputs the generated driver image to the ECU 9 via the in-vehicle network.

The GPS receiver 4 receives GPS signals from GPS satellites at predetermined intervals, and determines the position of the vehicle 10, based on the received GPS signals. The GPS receiver 4 outputs positioning information indicating the result of determination of the position of the vehicle 10 based on the GPS signals to the ECU 9 via the in-vehicle network at predetermined intervals. Instead of the GPS receiver, the vehicle 10 may include a receiver that receives positioning signals from satellites of another satellite positioning system to determine the position of the vehicle 10.

The motion sensor 5 is a sensor for detecting motion of the vehicle 10, and may be, for example, an acceleration sensor, a speed sensor, or a gyro sensor. The vehicle control system 1 may include different types of motion sensors 5. Every time a sensor signal indicating motion of the vehicle 10 is generated, the motion sensor 5 outputs the generated sensor signal to the ECU 9. A sensor signal generated by the motion sensor 5 (e.g., an acceleration/deceleration-indicating signal generated by the acceleration sensor or a speed-indicating signal generated by the speed sensor) is an example of a vehicle motion signal indicating motion of the vehicle 10.

The wireless communication terminal 6 communicates with a wireless base station by wireless in conformity with a predetermined standard of mobile communications. The wireless communication terminal 6 receives map information representing the first or second map or update information of the first or second map from the map server via the wireless base station. The wireless communication terminal 6 outputs the received map information or update information to the storage device 8 via the in-vehicle network.

The notification device 7 is provided in the interior of the vehicle 10, and gives predetermined notification to the driver by light, voice, vibration, or display of text or an image. To achieve this, the notification device 7 includes, for example, at least one of a speaker, a light source, a vibrator, or a display. When a notification signal indicating predetermined notification (e.g., a hands-on request or a transition demand) to the driver is received from the ECU 9, the notification device 7 gives this notification to the driver by a voice from the speaker, lighting up or blinking of the light source, vibration of the vibrator, or displaying a message on the display. When the notification device 7 includes two or more types of devices, the notification may be given to the driver via each of the two or more types of devices.

The storage device 8, which is an example of the storage unit, includes, for example, a hard disk drive, a nonvolatile semiconductor memory, or an optical medium and an access device therefor. The storage device 8 stores the first and second maps, and stores, for each of the first and second maps, update information indicating the dates and times of the last update of information on individual road sections represented in the map. Each of the first and second maps may further include information indicating the accuracy of information on a road (e.g., an average error of the positions of features represented in the map).

The storage device 8 further includes a processor for executing, for example, a process to update the first or second map and a process related to a request from the ECU 9 to read out a map. For example, every time the vehicle 10 moves a predetermined distance, the storage device 8 transmits a request to obtain first and second maps, together with the current position of the vehicle 10, to the map server via the wireless communication terminal 6. The storage device 8 then receives map information including the first and second maps of a predetermined region around the current position of the vehicle 10 from the map server via the wireless communication terminal 6, and stores the first and second maps included in the received map information. When update information of the first or second map is received via the wireless communication terminal 6, the storage device 8 stores the update information. When a request from the ECU 9 to read out a map is received, the storage device 8 cuts out that portion of the first and second maps stored therein which includes the current position of the vehicle 10 and which represents a region smaller than the predetermined region, and outputs the cutout portion to the ECU 9 via the in-vehicle network.

The ECU 9 executes autonomous driving control of the vehicle 10, based on the first or second map. In addition, when executing autonomous driving control of the vehicle 10, the ECU 9 determines whether an involvement requirement for requesting involvement in driving the vehicle is satisfied. When the involvement requirement is satisfied, the ECU 9 requests the driver to be involved in driving, via the notification device 7.

Examples of the request for involvement in driving include a request for holding the steering wheel (hands-on request) and a request for transferring control to the driver (transition demand).

As illustrated in FIG. 2, the ECU 9 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 9 to another device. Every time an image is received from the camera 2, the communication interface 21 passes the received image to the processor 23. Every time a driver image is received from the driver monitoring camera 3, the communication interface 21 passes the received driver image to the processor 23. Every time positioning information is received from the GPS receiver 4, the communication interface 21 passes the positioning information to the processor 23. Every time a sensor signal is received from the motion sensor 5, the communication interface 21 passes the sensor signal to the processor 23. Further, the communication interface 21 passes the first and second maps and update information read from the storage device 8 to the processor 23, and outputs a notification signal received from the processor 23 to the notification device 7.

The memory 22, which is another example of the storage unit, includes, for example, volatile and nonvolatile semiconductor memories, and stores various types of data used in a vehicle control process executed by the processor 23. For example, the memory 22 stores images of the surroundings of the vehicle 10 received from the camera 2, driver images received from the driver monitoring camera 3, positioning information of the vehicle 10 received from the GPS receiver 4, measured values indicating motion of the vehicle 10 in sensor signals received from the motion sensor 5, and the first and second maps and update information read from the storage device 8. The memory 22 further stores parameters of the camera 2 such as the focal length, the orientation, and the mounted position as well as various parameters for specifying a classifier for object detection, which is used for detecting, for example, a feature. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 3:
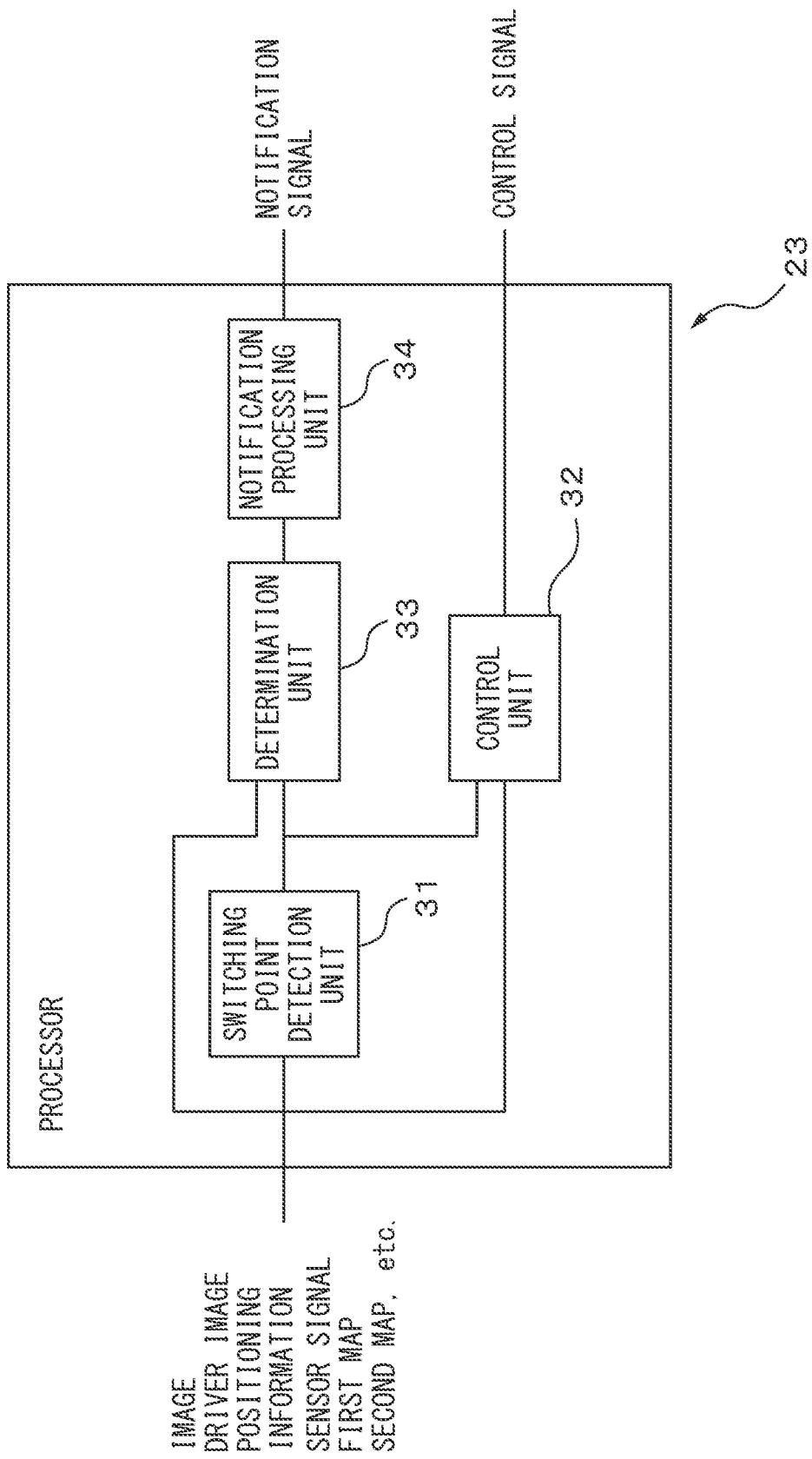
FIG. 3 is a functional block diagram of a processor of the electronic control unit, related to a vehicle control process.

FIG. 3 is a functional block diagram of the processor 23, related to the vehicle control process. The processor 23 includes a switching point detection unit 31, a control unit 32, a determination unit 33, and a notification processing unit 34. These units included in the processor 23 are functional modules, for example, implemented by a computer program executed by the processor 23, or may be dedicated operating circuits provided in the processor 23.

The switching point detection unit 31 detects a switching point at which the map used for travel control of the vehicle 10 will be switched from one of the first and second maps to the other, in a section from the current position of the vehicle 10 to a predetermined distance away in the travel direction of the vehicle 10.

To achieve this, the switching point detection unit 31 determines the position of the vehicle 10 indicated by the latest positioning information as the current position of the vehicle 10. The switching point detection unit 31 identifies the travel direction of the vehicle 10, based on the changes in the position of the vehicle 10 indicated by the latest pieces of positioning information or on a sensor signal indicating the orientation of the vehicle 10 received by the ECU 9 from an orientation sensor (not illustrated) mounted on the vehicle 10. In addition, the switching point detection unit 31 identifies the road including the current position of the vehicle 10 as the road being traveled by the vehicle 10, by referring to the first or second map being used for travel control of the vehicle 10 at present.

Regarding the section from the current position of the vehicle 10 to a predetermined distance away in the road being traveled by the vehicle 10, the switching point detection unit 31 compares the timings of the last update of the first and second maps by referring to update information. The switching point detection unit 31 determines whether there is a section where the update timing of the first or second map being used for travel control of the vehicle 10 at the current position of the vehicle 10 is earlier than the update timing of the other map. When there is such a section, the switching point detection unit 31 detects the start point of this section, which is an end closer to the vehicle 10, as a switching point.

Alternatively, the switching point detection unit 31 determines whether there is an unrepresented section that is not represented in the first or second map being used for travel control of the vehicle 10 at the current position of the vehicle 10, in the section from the current position of the vehicle 10 to a predetermined distance away in the road being traveled by the vehicle 10. When an unrepresented section is represented in the other map, the switching point detection unit 31 detects the start point of the unrepresented section, which is an end closer to the vehicle 10, as a switching point.

Alternatively, the switching point detection unit 31 determines whether there is an inconsistent section where information represented in the first map is inconsistent with information represented in the second map, in the section from the current position of the vehicle 10 to a predetermined distance away. When there is an inconsistent section, the switching point detection unit 31 may detect the start point and the end point of the inconsistent section, which are an end closer to the vehicle 10 and the other end farther from the vehicle 10, respectively, as switching points. However, the switching point detection unit 31 may omit to set the ends of an inconsistent section as switching points, when, of the first and second maps, a map with a shorter elapsed time since the timing of update of information on the inconsistent section is the same as a map with a shorter elapsed time since the timing of update of information on the sections in front of and behind the inconsistent section. This is because the map with a shorter elapsed time since the timing of update of information is likely to represent more accurate information than the other map in any of the inconsistent section and the sections in front of and behind the inconsistent section.

To detect an inconsistent section, the switching point detection unit 31 sets sampling points at first intervals (e.g., intervals of several hundred meters to 1 km) in the section from the current position of the vehicle 10 to a predetermined distance away along the travel direction of the vehicle 10. For each sampling point, the switching point detection unit 31 calculates the distance between the position of a feature on or around the road being traveled by the vehicle 10 (e.g., a lane line, a curbstone, a guardrail, or a signpost) represented in the first map at the sampling point and the position of a corresponding feature represented in the second map, as the degree of inconsistency. When a feature extending along the road, such as a lane line in the above example, is used for calculating the degree of inconsistency, the switching point detection unit 31 calculates the distance to that position in a corresponding feature represented in the second map which is closest to the position of the feature represented in the first map at a sampling point of interest, as the degree of inconsistency. The switching point detection unit 31 may calculate an average of the distances between the positions of features represented in the first map at a sampling point of interest and those of corresponding features represented in the second map, as the degree of inconsistency.

The switching point detection unit 31 compares the degrees of inconsistency calculated for the respective sampling points with a predetermined threshold, and identifies a sampling point where the degree of inconsistency is not less than the predetermined threshold. In front of and behind the sampling point where the degree of inconsistency is not less than the predetermined threshold, the switching point detection unit 31 resets sampling points at second intervals (e.g., intervals of several dozen meters to 100 m) each of which is shorter than the first interval. For each reset sampling point, the switching point detection unit 31 calculates the degree of inconsistency between the first and second maps in the same manner as described above. Among the reset individual sampling points, the switching point detection unit 31 identifies sampling points where the degree of inconsistency is not less than the predetermined threshold. The switching point detection unit 31 then detects a section from the sampling point previous to the one closest to the vehicle 10 of the sampling points where the degree of inconsistency is not less than the predetermined threshold to the sampling point next to the one farthest from the vehicle 10 of the sampling points where the degree of inconsistency is not less than the predetermined threshold, as an inconsistent section.

The switching point detection unit 31 may set the degree of inconsistency not less than the predetermined threshold for a sampling point where the number of lanes or the number of lane lines differs between the first and second maps. The switching point detection unit 31 may also set the degree of inconsistency not less than the predetermined threshold for a sampling point where the type of lane line differs between the first and second maps. In addition, the switching point detection unit 31 may set a point where the presence or absence of a predetermined feature, such as a signpost or a guardrail, differs between the first and second maps, as a sampling point whose degree of inconsistency is not less than the predetermined threshold.

The switching point detection unit 31 notifies the control unit 32 of the detected switching point.

The control unit 32 controls travel of the vehicle 10 by referring to the first or second map being used for travel control of the vehicle 10. In the present embodiment, a map that has been used so far of the first and second maps is used for travel control until the vehicle 10 reaches the switching point. After the vehicle passes the switching point, the control unit 32 uses the other of the first and second maps for travel control. More specifically, when setting of the switching point is based on the difference between the timings of the last update of the first and second maps, the control unit 32 uses the first or second map updated at a later timing for travel control in the section nearer than the switching point and the section beyond the switching point. When setting of the switching point is based on whether there is an unrepresented section, the control unit 32 uses the first or second map representing information on the unrepresented section for travel control in the section nearer than the switching point and the section beyond the switching point. When setting of the switching point is based on whether there is an inconsistent section, the control unit 32 uses the first map, which represents information on the road more accurately of the first and second maps, for travel control in sections other than the inconsistent section, and uses the second map or a map with a shorter elapsed time since the timing of the last update for travel control in the inconsistent section.

For example, the control unit 32 controls components of the vehicle 10 so that the vehicle 10 continues traveling on a host vehicle lane. To this end, the control unit 32 generates a planned trajectory extending in the host vehicle lane by referring to the map being used for travel control. For example, the control unit 32 generates a planned trajectory extending along the center of the area between those lane lines demarcating the host vehicle lane which are represented in the map. The control unit 32 controls components of the vehicle 10 so that the vehicle 10 travels along the planned trajectory.

To achieve this, the control unit 32 detects the position of the vehicle 10 at predetermined intervals, and compares the detected position of the vehicle 10 with the planned trajectory. To detect the accurate position of the vehicle 10, the control unit 32 compares an image generated by the camera 2 with the map being used for travel control. For example, assuming the position and orientation of the vehicle 10, the control unit 32 projects features on or around the road detected from an image onto the map or features on or around the road in the vicinity of the vehicle 10 represented in the map onto the image. The features on or around the road may be, for example, road markings such as lane lines or stop lines, or curbstones. The control unit 32 detects the position and orientation of the vehicle 10 for the case where the features detected from the image match those represented in the map the best, as the accurate position of the vehicle 10, and detects a lane on the map including the position of the vehicle as the host vehicle lane. Further, the control unit 32 determines lane lines detected at positions closest to the vehicle 10 in regions in the image respectively corresponding to the left and right of the vehicle 10, as the lane lines demarcating the host vehicle lane.

The control unit 32 uses initial values of the assumed position and orientation of the vehicle 10 and parameters of the camera 2, such as the focal length, the height of the mounted position, and the orientation, to determine the positions in the map or the image to which the features are projected. As the initial values of the position and orientation of the vehicle 10 is used the latest position of the vehicle 10 determined by the GPS receiver 4 or the position obtained by correcting, with odometry information, the position and orientation of the vehicle 10 estimated at the last detection of the position of the vehicle. The control unit 32 then calculates the degree of matching between the features on or around the road detected from the image and the corresponding features represented in the map (e.g., the inverse of the sum of squares of the distances between corresponding features).

The control unit 32 repeats the above-described processing while varying the assumed position and orientation of the vehicle 10, and detects the assumed position and orientation for the case where the degree of matching is a maximum, as the accurate position of the vehicle 10.

For example, the control unit 32 inputs an image into a classifier that has been trained to detect detection target features from an image, thereby detecting these features. As such a classifier, the control unit 32 can use a deep neural network (DNN) having architecture of a convolutional neural network (CNN) type, such as Single Shot MultiBox Detector or Faster R-CNN. Alternatively, as such a classifier, the control unit 32 may use a DNN having architecture of a self-attention network (SAN) type, such as Vision Transformer, or a classifier based on another machine learning technique, such as an AdaBoost classifier. Such a classifier is trained in advance with a large number of training images representing a detection target feature in accordance with a predetermined training technique, such as backpropagation, so as to detect this feature from an image.

The control unit 32 may measure the position of the vehicle 10 without using a map. In particular, when the second map, which represents information on the road less accurately of the first and second maps, is used for travel control, the control unit 32 can prevent a decrease in the accuracy of estimation of the position of the vehicle 10 by estimating the position of the vehicle 10 without using a map. In this case, the control unit 32 inputs an image obtained by the camera 2 into the classifier to detect those left and right lane lines demarcating the host vehicle lane which are represented in the image. Based on reference positions in the horizontal direction of pixels representing the left and right lane lines closest to the bottom of the image as well as parameters such as the focal length, the orientation, and the height of the mounted position of the camera 2, the control unit 32 estimates those positions of the left and right lane lines relative to the camera 2 which correspond to the reference positions in the image. The control unit 32 further determines the distances from the camera 2 to the left and right lane lines, based on the result of estimation, the lengthwise direction of the lane lines, and the orientation of the camera 2, thereby measuring the position of the vehicle 10 in the lateral direction in the host vehicle lane.

When the measured position of the vehicle 10 is on the planned trajectory, the control unit 32 determines the steering angle of the vehicle 10 so that the vehicle 10 proceeds along the planned trajectory, and controls the steering of the vehicle 10 so that the steering angle is the same as determined. When the measured position of the vehicle 10 is apart from the planned trajectory, the control unit 32 determines the steering angle of the vehicle 10 so that the vehicle 10 approaches the planned trajectory, and controls the steering of the vehicle 10 so that the steering angle is the same as determined.

In addition, the control unit 32 sets the regulation speed of the road being traveled by the vehicle 10 as a target speed by referring to the current position of the vehicle 10 and the map being used for travel control, and controls components of the vehicle 10 so that the speed of the vehicle 10 approaches the set target speed. Further, the control unit 32 controls the acceleration or deceleration of the vehicle 10 so as to keep at least a certain distance between the vehicle 10 and a vehicle traveling ahead of the vehicle 10 on the host vehicle lane. To achieve this, the control unit 32 inputs an image obtained by the camera 2 into a classifier that has been trained to detect a vehicle, thereby detecting other vehicles traveling in the vicinity of the vehicle 10. As such a classifier, the control unit 32 can use a classifier similar to that used for detecting features. Alternatively, the classifier used for detecting features may also be trained in advance to detect a vehicle. In this case, the control unit 32 can detect other vehicles as well as features by inputting an image into the classifier used for detecting features. Of the detected vehicles, the control unit 32 determines a vehicle whose bottom is in the region in the image sandwiched between two lane lines demarcating the host vehicle lane as a vehicle ahead. In addition, the control unit 32 estimates the distance between the vehicle 10 and the vehicle ahead, based on the bottom position of an object region in the image representing the vehicle ahead and parameters such as the orientation, the focal length, and the height of the mounted position of the camera 2. When the estimated distance to the vehicle ahead is less than the certain distance, the control unit 32 sets the acceleration or deceleration of the vehicle 10 so as to decelerate the vehicle 10. When the estimated distance to the vehicle ahead is not less than the certain distance, the control unit 32 sets the acceleration or deceleration of the vehicle 10 so that the speed of the vehicle 10 approaches the target speed.

Upon setting acceleration or deceleration as described above, the control unit 32 sets the degree of accelerator opening or the amount of braking according to the set acceleration or deceleration. The control unit 32 determines the amount of fuel injection according to the set degree of accelerator opening, and outputs a control signal depending on the amount of fuel injection to a fuel injector of an engine of the vehicle 10. Alternatively, the control unit 32 determines electric power to be supplied to a motor according to the set degree of accelerator opening, and controls a driving circuit of the motor so that the determined electric power is supplied to the motor. Alternatively, the control unit 32 outputs a control signal depending on the set amount of braking to the brake of the vehicle 10.

In the case where the driver disobeys a request for involvement in driving even after a predetermined period from notification to the driver of the request, the control unit 32 may stop autonomous driving control or the vehicle 10. For example, in the case where the ECU 9 does not receive a signal indicating that the steering wheel is held from a touch sensor (not illustrated) provided in the steering even after a predetermined period from notification of a hands-on request, the control unit 32 may stop autonomous driving control and transfer driving control to the driver. In the case where the ECU 9 does not receive a signal indicating that the steering wheel is held from the touch sensor provided in the steering or a signal indicating that the steering, the accelerator, or the brake is operated even after a predetermined period from notification of a transition demand, the control unit 32 may stop the vehicle 10.

The determination unit 33 determines whether an involvement requirement is satisfied. In the present embodiment, the determination unit 33 compares the distances from the vehicle 10 to the left and right lane lines demarcating the host vehicle lane (hereafter "lateral distances") with a hands-on request threshold. When the left or right lateral distance is less than the hands-on request threshold, the determination unit 33 determines that the involvement requirement is satisfied. When determining that the involvement requirement is satisfied, the determination unit 33 notifies the notification processing unit 34 of the result of determination. The hands-on request threshold is an example of the distance threshold.

The determination unit 33 sets the hands-on request threshold to a higher value when the second map is used for travel control than when the first map is used for travel control. In other words, the determination unit 33 makes the involvement requirement less strict when the second map is used for travel control than when the first map is used for travel control. For example, the determination unit 33 sets the hands-on request threshold for the case where the first map is used for travel control to 0.2 m to 0.3 m, and the hands-on request threshold for the case where the second map is used for travel control to 0.4 m to 0.5 m. Setting the hands-on request threshold in this way enables requesting the driver to hold the steering wheel before the vehicle 10 approaches a lane line too much, even when the second map, which represents information on the road with relatively low accuracy, is used for travel control.

Based on the positions in an image of lane lines detected from the image and parameters of the camera 2, the determination unit 33 estimates the positions of the lane lines relative to the camera 2, as described in relation to the control unit 32. For each of the left and right sides of the vehicle 10, the determination unit 33 further determines the lateral distance by subtracting the distance from the mounted position of the camera 2 to the side surface of the vehicle 10 from the distance from the camera 2 to the lane line.

Figure 4:
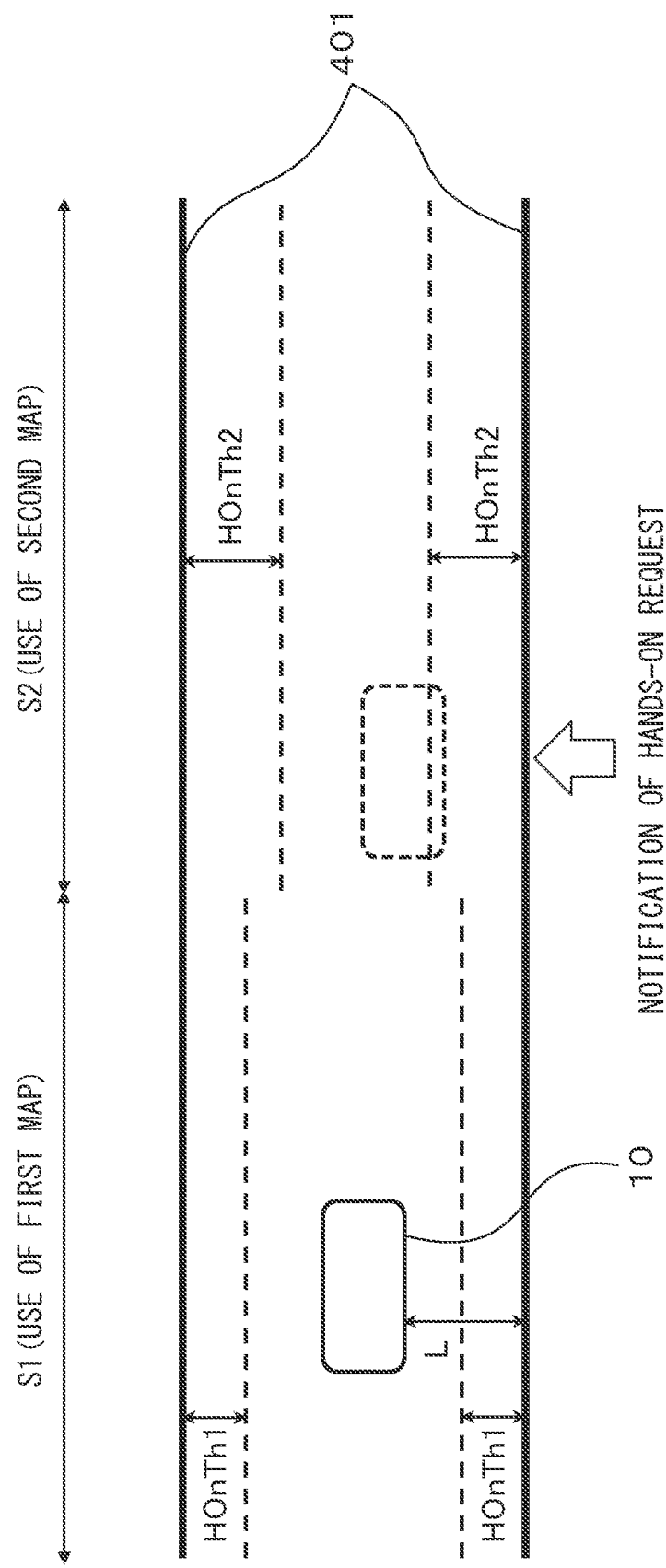
FIG. 4 illustrates an example of a hands-on request threshold for the case where a first map is used for travel control and a hands-on request threshold for the case where a second map is used for travel control.

FIG. 4 illustrates an example of the hands-on request threshold for the case where the first map is used for travel control and the hands-on request threshold for the case where the second map is used for travel control. In this example, while the vehicle 10 is traveling on a section S1, the first map is used for travel control. While the vehicle 10 is traveling on a section S2, the second map is used for travel control.

While the vehicle 10 is traveling on the section S1, a first value HOnTh1 is used as the hands-on request threshold. Thus, when the lateral distance L between a left or right lane line 401 and the vehicle 10 falls below the hands-on request threshold HOnTh1 during travel of the vehicle 10 on the section S1, it is determined that an involvement requirement is satisfied, and notification of a hands-on request is given.

While the vehicle 10 is traveling on the section S2, a second value HOnTh2 is used as the hands-on request threshold. Thus, when the lateral distance L between the left or right lane line 401 and the vehicle 10 falls below the hands-on request threshold HOnTh2 during travel of the vehicle 10 on the section S2, it is determined that an involvement requirement is satisfied, and notification of a hands-on request is given. The second value HOnTh2 is set greater than the first value HOnTh1. Thus the involvement requirement is more easily satisfied when the second map is used for travel control than when the first map is used for travel control. Hence, notification of a hands-on request will be given before the vehicle 10 approaches the lane line 401 too much, even when the second map, which represents information on the road with relatively low accuracy, is used for travel control.

Further, the determination unit 33 compares the lateral distances to the left and right lane lines with a transition demand threshold. When the left or right lateral distance is less than the transition demand threshold, the determination unit 33 determines that the involvement requirement is satisfied. The transition demand threshold is another example of the distance threshold.

The determination unit 33 sets the transition demand threshold to a higher value when the second map is used for travel control than when the first map is used for travel control. For example, the determination unit 33 sets the transition demand threshold for the case where the first map is used for travel control to 0.1 m to 0.2 m, and the transition demand threshold for the case where the second map is used for travel control to 0.2 m to 0.3 m. Setting the transition demand threshold in this way enables the determination unit 33 to transfer driving control to the driver before the vehicle 10 approaches a lane line too much, even when the second map, which represents information on the road with relatively low accuracy, is used for travel control.

FIG. 5 illustrates an example of the transition demand threshold for the case where the first map is used for travel control and the transition demand threshold for the case where the second map is used for travel control. In this example, while the vehicle 10 is traveling on a section S1, the first map is used for travel control. While the vehicle 10 is traveling on a section S2, the second map is used for travel control.

While the vehicle 10 is traveling on the section S1, a first value TDTh1 is used as the transition demand threshold. Thus, when the lateral distance L between a left or right lane line 501 and the vehicle 10 falls below the transition demand threshold TDTh1 during travel of the vehicle 10 on the section S1, it is determined that an involvement requirement is satisfied, and notification of a transition demand is given.

While the vehicle 10 is traveling on the section S2, a second value TDTh2 is used as the transition demand threshold. Thus, when the lateral distance L between the left or right lane line 501 and the vehicle 10 falls below the transition demand threshold TDTh2 during travel of the vehicle 10 on the section S2, it is determined that an involvement requirement is satisfied, and notification of a transition demand is given. The second value TDTh2 is set greater than the first value TDTh1. Thus the involvement requirement is more easily satisfied when the second map is used for travel control than when the first map is used for travel control. Hence, notification of a transition demand will be given before the vehicle 10 approaches the lane line 501 too much, even when the second map, which represents information on the road with relatively low accuracy, is used for travel control.

Upon receiving the result of determination that the involvement requirement is satisfied from the determination unit 33, the notification processing unit 34 notifies the driver of a request corresponding to the satisfied involvement requirement via the notification device 7.

When it is determined that the lateral distance has fallen below the hands-on request threshold, as described above, the notification processing unit 34 notifies the driver of a hands-on request via the notification device 7. When it is determined that the lateral distance has fallen below the transition demand threshold, the notification processing unit 34 notifies the driver of a transition demand via the notification device 7.

FIG. 6 is an operation flowchart of the vehicle control process related to a change of the degree of the driver's involvement in driving. The processor 23 executes the vehicle control process at predetermined intervals in accordance with the operation flowchart described below.

The determination unit 33 of the processor 23 determines whether the map being used for travel control is the first map (step S101).

When the map being used for travel control is the first map (Yes in step S101), the determination unit 33 sets a relatively strict involvement requirement (step S102). When the map being used for travel control is the second map (No in step S101), the determination unit 33 sets a relatively relaxed involvement requirement (step S103).

The determination unit 33 determines whether the set involvement requirement is satisfied (step S104). When the involvement requirement is satisfied (Yes in step S104), the notification processing unit 34 of the processor 23 notifies the driver of a request for involvement in driving which corresponds to the satisfied involvement requirement via the notification device 7 (step S105).

When the involvement requirement is not satisfied in step S104 (No in step S104) or after step S105, the processor 23 terminates the vehicle control process.

As has been described above, the vehicle controller determines whether an involvement requirement for requesting a driver of the vehicle to be involved in driving the vehicle is satisfied, and gives notification of a request for involvement in driving via a notification device provided in the vehicle interior when it is determined that the involvement requirement is satisfied. The vehicle controller makes the involvement requirement stricter when autonomous driving control of the vehicle is based on the first map than when autonomous driving control of the vehicle is based on the second map representing information on a road less accurately than the first map. This results in the involvement requirement being more easily satisfied when the second map is used for travel control. Thus the vehicle controller can request the driver to be involved in driving before the vehicle falls into an unstable state, even when the second map, which represents information on the road with relatively low accuracy, is used for travel control. As a result, the vehicle controller can prevent the driver feeling uneasy about motion of the vehicle during autonomous driving control.

According to a modified example, the hands-on request threshold for the case where the second map is used for travel control may be set greater than a value corresponding to half the width of the host vehicle lane. In this case, while the second map is used for travel control, the involvement requirement will be always satisfied, causing the notification processing unit 34 to always request the driver to hold the steering wheel.

According to another modified example, the determination unit 33 may adjust the hands-on request threshold or the transition demand threshold, depending on the degree of inconsistency between the first and second maps, in a section where the second map is used for travel control. For example, the determination unit 33 may increase the hands-on request threshold or the transition demand threshold as the degree of inconsistency increases. In this case, the determination unit 33 refers to the average of the degrees of inconsistency at individual sampling points in an inconsistent section, which are calculated by the switching point detection unit 31, and increases the hands-on request threshold or the transition demand threshold with this average. Specifically, the hands-on request threshold or the transition demand threshold may also increase continuously as the average of the degrees of inconsistency increases. Alternatively, the hands-on request threshold or the transition demand threshold may be set stepwise. In this case, every time the average of the degrees of inconsistency increases by a predetermined value, the determination unit 33 increases the hands-on request threshold or the transition demand threshold by a predetermined stepped amount. In addition, the determination unit 33 may divide an inconsistent section into multiple subsections, and adjust the hands-on request threshold or the transition demand threshold on a subsection-by-subsection basis. In this case, for each subsection, the determination unit 33 calculates the average of the degrees of inconsistency at individual sampling points included in the subsection, and increases the hands-on request threshold or the transition demand threshold with the average of the degrees of inconsistency of the subsection, similarly to the above-described processing. When setting of the switching point is not based on an inconsistent section, the determination unit 33 may also adjust the hands-on request threshold or the transition demand threshold, based on the degree of inconsistency, in a section where the second map is used for travel control, by executing processing similar to that described above.

Figure 7A:
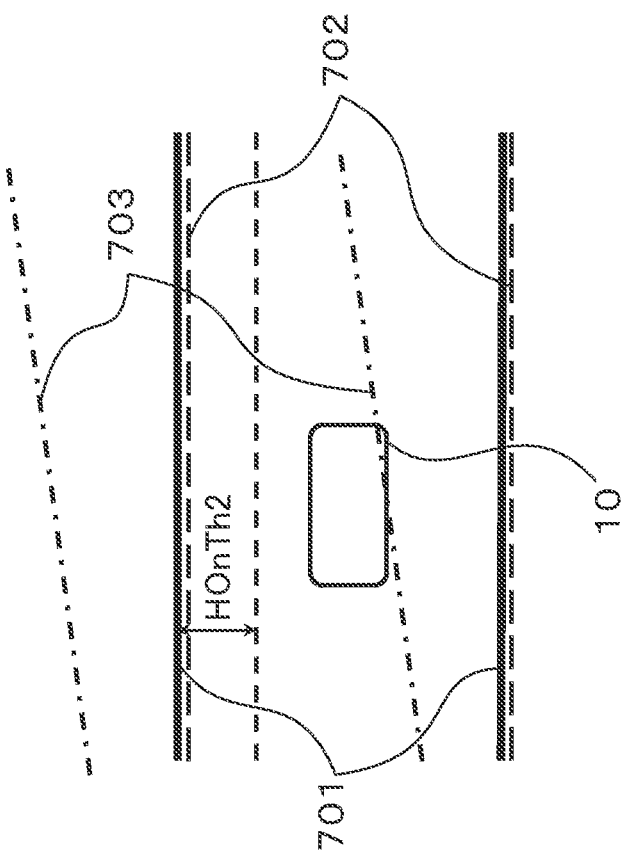
FIG. 7A illustrates an example of adjustment to the hands-on request threshold according to a modified example.
Figure 7B:
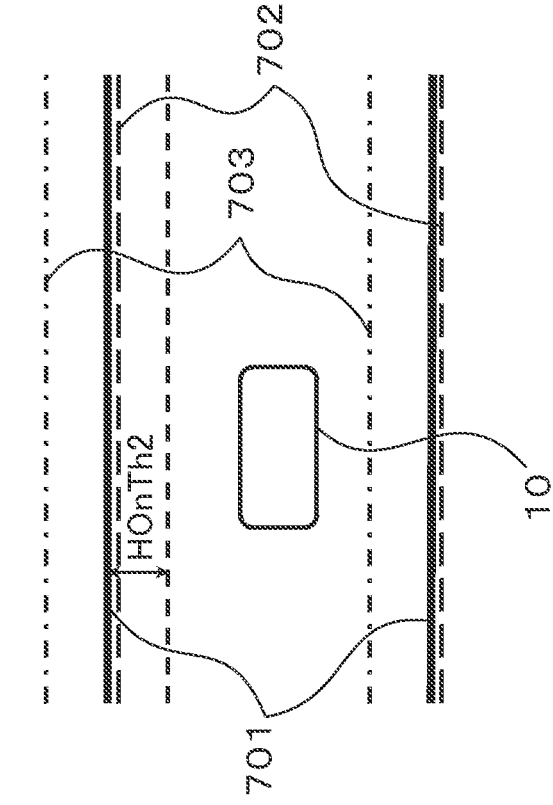
FIG. 7B illustrates an example of adjustment to the hands-on request threshold according to a modified example.

FIGS. 7A and 7B illustrate examples of adjustment to the hands-on request threshold according to this modified example. In FIGS. 7A and 7B, lane lines 701 demarcating a host vehicle lane being traveled by the vehicle 10 are indicated by solid lines. In the first map, the lane lines are indicated by dashed lines 702, and in the second map, by dashed and dotted lines 703. In the example illustrated in FIG. 7A, the degree of inconsistency between the lane lines 702 represented in the first map and the lane lines 703 represented in the second map is relatively low. Hence, the hands-on request threshold HOnTh2 for the case where the second map is used for travel control is set to a relatively low value. However, even in this case, the hands-on request threshold HOnTh2 is set greater than the hands-on request threshold for the case where the first map is used for travel control.

In contrast, in the example illustrated in FIG. 7B, the degree of inconsistency between the lane lines 702 represented in the first map and the lane lines 703 represented in the second map is relatively high. Hence, the hands-on request threshold HOnTh2 for the case where the second map is used for travel control is set greater than that in the example illustrated in FIG. 7A.

In this way, the determination unit 33 adjusts the hands-on request threshold or the transition demand threshold, depending on the degree of inconsistency between the first and second maps, enabling more appropriate prevention of the vehicle 10 approaching a lane line too much.

In addition, when the second map is used for travel control, the determination unit 33 may increase the hands-on request threshold or the transition demand threshold as the degree of reliability of a detected lane line demarcating the host vehicle lane decreases. In this case, the determination unit 33 may use a confidence score of the lane line outputted by the classifier used for detecting lane lines, as the degree of reliability.

According to still another modified example, the determination unit 33 may determine whether the involvement requirement is satisfied, based on motion of the vehicle 10, the driver's state, or conditions around the vehicle 10, instead of lateral distances. In this case also, the determination unit 33 preferably makes the involvement requirement less strict when the second map is used for travel control than when the first map is used for travel control. This relaxation of the involvement requirement for the case where the second map is used for travel control enables the determination unit 33 to request the driver to be involved in driving before the vehicle 10 falls into an unstable state caused by motion of the vehicle 10, the driver's state, or conditions around the vehicle 10, even when the second map is used for travel control.

For example, the determination unit 33 determines that the involvement requirement is satisfied, when the speed of the vehicle 10 measured by the speed sensor, which is an example of the motion sensor 5, is greater than a regulation speed of a road being traveled by the vehicle 10 by more than a predetermined speed threshold. The notification processing unit 34 then notifies the driver of a hands-on request via the notification device 7. In this case, the determination unit 33 sets the speed threshold to a lower value when the second map is used for travel control than when the first map is used for travel control. This enables the determination unit 33 to appropriately request the driver to be involved in driving, when the speed of the vehicle 10 exceeds the regulation speed. The determination unit 33 identifies a road including the position of the vehicle 10 indicated by the latest positioning information obtained by the GPS receiver 4 as the road being traveled by the vehicle 10, by referring to the map being used for travel control. The determination unit 33 then identifies the regulation speed of the road being traveled by the vehicle 10, by referring to the map being used for travel control. Alternatively, the determination unit 33 may input an image generated by the camera 2 into a classifier that has been trained to detect a regulation speed represented in a speed sign, thereby identifying the regulation speed of the road being traveled by the vehicle 10. As such a classifier, the determination unit 33 can use a classifier similar to the classifier used for detecting features, which has been described in relation to the control unit 32.

Further, the determination unit 33 determines that the involvement requirement is satisfied, when the vehicle 10 is traveling on a section whose regulation speed is less than a predetermined speed. The notification processing unit 34 then notifies the driver of a hands-on request via the notification device 7. In this case, the determination unit 33 sets the predetermined speed greater when the second map is used for travel control than when the first map is used for travel control. This enables the determination unit 33 to appropriately request the driver to be involved in driving, when the regulation speed of the road being traveled by the vehicle 10 is low and more careful control of the vehicle 10 is required.

Alternatively, the determination unit 33 determines that the involvement requirement is satisfied, when the radius of curvature of a curve in a section being traveled by the vehicle 10 or extending to a predetermined distance (e.g., several hundred meters to 1 km) away is less than a predetermined curvature radius threshold. When the radius of curvature of the curve is less than the predetermined curvature radius threshold, the notification processing unit 34 notifies the driver of a hands-on request via the notification device 7. Alternatively, the notification processing unit 34 may notify the driver of a transition demand via the notification device 7. In this case, the determination unit 33 sets the curvature radius threshold to a higher value when the second map is used for travel control than when the first map is used for travel control. This enables the determination unit 33 to appropriately request the driver to be involved in driving, depending on the radius of curvature of the curve that is being traveled or will be traveled by the vehicle 10. In the same manner as described above, the determination unit 33 identifies a road including the position of the vehicle 10 indicated by the latest positioning information obtained by the GPS receiver 4 as the road being traveled by the vehicle 10, by referring to the map being used for travel control. The determination unit 33 further identifies the radius of curvature of the curve included in the section from the current position of the vehicle 10 to a predetermined distance away in the road being traveled by the vehicle 10, by referring to the travel direction of the vehicle 10 indicated by the orientation sensor (not illustrated) mounted on the vehicle 10 and the map being used for travel control.

Alternatively, the determination unit 33 determines that the involvement requirement is satisfied, when the gradient of a road in a section being traveled by the vehicle or extending to a predetermined distance away is not less than a predetermined gradient threshold. The notification processing unit 34 then notifies the driver of a hands-on request via the notification device 7. Alternatively, the notification processing unit 34 may notify the driver of a transition demand via the notification device 7. In this case, the determination unit 33 sets the gradient threshold to a lower value when the second map is used for travel control than when the first map is used for travel control. This enables the determination unit 33 to appropriately request the driver to be involved in driving, depending on the gradient of the road section that is being traveled or will be traveled by the vehicle 10. In the same manner as described above, the determination unit 33 identifies a road including the position of the vehicle 10 indicated by the latest positioning information obtained by the GPS receiver 4 as the road being traveled by the vehicle 10, by referring to the map being used for travel control. The determination unit 33 further identifies the gradient of the section from the current position of the vehicle 10 to a predetermined distance away in the road being traveled by the vehicle 10, by referring to the travel direction of the vehicle 10 indicated by the orientation sensor (not illustrated) mounted on the vehicle 10 and the map being used for travel control.

Alternatively, the determination unit 33 determines that the involvement requirement is satisfied, when an unheld period during which the steering wheel is not held by the driver has continued for more than a predetermined unheld period threshold. The notification processing unit 34 then notifies the driver of a hands-on request via the notification device 7. In this case, the unheld period threshold is set to a lower value when the second map is used for travel control than when the first map is used for travel control. The determination unit 33 determines the time elapsed since the last reception by the ECU 9 of a signal indicating that the steering wheel is held from the touch sensor provided in the steering, as the unheld period.

Alternatively, the determination unit 33 determines that the involvement requirement is satisfied, when the driver has been ignoring a face lost warning, a looking-aside warning, an eye-closing warning, or a no-hand driving warning issued via the notification device 7 for more than a predetermined time threshold. The notification processing unit 34 then notifies the driver of a hands-on request via the notification device 7. In this case, the time threshold is set to a lower value when the second map is used for travel control than when the first map is used for travel control.

The determination unit 33 inputs a driver image generated by the driver monitoring camera 3 into a classifier that has been trained to detect a driver's face, thereby determining whether a face region representing the driver's face can be detected in the driver image. As such a classifier, the determination unit 33 can use a classifier similar to that used by the control unit 32 for detecting features. When no face region is detected, the determination unit 33 determines that the driver is in a face lost state in which his/her face cannot be detected. When the face lost state has continued for a predetermined period, the determination unit 33 notifies the driver of a face lost warning via the notification device 7. In the case where the driver's face is started to be detected from driver images generated after the notification of the face lost warning or where the driver takes action to respond to the face lost warning, the determination unit 33 determines that the driver has responded to the face lost warning. In the case where the driver's face is not detected from driver images even after the notification of the face lost warning and where the driver does not take action to respond to the face lost warning, the determination unit 33 determines that the driver has ignored the face lost warning. The action to respond is taken, for example, by operating a predetermined switch provided in the vehicle interior or by the driver giving predetermined utterance. The driver's voice is collected by a speaker provided in the vehicle interior and outputted to the ECU 9 as a voice signal. The processor 23 executes a predetermined voice recognition process, such as GMM-HMM or DNN-HMM, on the voice signal to determine whether the driver has given the predetermined utterance.

Further, the determination unit 33 matches the face region to a three-dimensional face model to determine the orientation of the driver's face. When the orientation of the driver's face is outside a predetermined angle range centered in the travel direction of the vehicle 10, the determination unit 33 determines that the driver is in a looking-aside state in which he/she is looking aside. Alternatively, the determination unit 33 may detect the driver's looking direction, and determines that he/she is in the looking-aside state, when the detected looking direction is outside the angle range. In this case, the determination unit 33 applies an edge detection filter to the face region to detect an edge extending in the horizontal direction, or inputs the face region into a classifier, thereby detecting the upper and lower eyelids of the driver's left or right eye. In addition, the determination unit 33 executes template matching on the region surrounded by the upper and lower eyelids to detect the pupillary centroid and a corneal reflection image of the light source. Based on the positional relationship between the pupillary centroid and the corneal reflection image of the light source, the determination unit 33 detects the looking direction. When the looking-aside state has continued for a predetermined period, the determination unit 33 notifies the driver of a looking-aside warning via the notification device 7. When the driver's face orientation or looking direction detected after the notification of the looking-aside warning is started to be within the angle range, i.e., when the looking-aside state ends, the determination unit 33 determines that the driver has responded to the looking-aside warning. When the looking-aside state does not end even after the notification of the looking-aside warning, the determination unit 33 determines that the driver has ignored the looking-aside warning.

In addition, the determination unit 33 calculates the ratio of the distance between the detected upper and lower eyelids to a reference distance between the upper and lower eyelids for the case where the driver's eyes are opened completely, as an eye-closing level. The reference distance is prestored in the memory 22. When the eye-closing level is not higher than a predetermined eye-closing threshold, the determination unit 33 determines that the driver is in an eye-closing state in which his/her eyes are closed. When the eye-closing state has continued for a predetermined period, the determination unit 33 notifies the driver of an eye-closing warning via the notification device 7. When the driver's eye-closing level detected after the notification of the eye-closing warning exceeds the eye-closing threshold, i.e., when the eye-closing state ends, the determination unit 33 determines that the driver has responded to the eye-closing warning. When the eye-closing state does not end even after the notification of the eye-closing warning, the determination unit 33 determines that the driver has ignored the eye-closing warning.

When the ECU 9 receives a signal indicating that the steering wheel is not held from the touch sensor provided in the steering, the determination unit 33 determines that that the driver is in a no-hand driving state in which he/she is not holding the steering wheel. When the no-hand driving state has continued for more than a predetermined time under autonomous driving control of the vehicle 10 by the ECU 9 at a level at which the driver is required to hold the steering wheel, the determination unit 33 notifies the driver of a no-hand driving warning via the notification device 7. When the ECU 9 receives a signal indicating that the steering wheel is held from the touch sensor after the notification of the no-hand driving warning, the determination unit 33 determines that the no-hand driving state has ended. When the ECU 9 does not receive a signal indicating that the steering wheel is held from the touch sensor even after the notification of the no-hand driving warning, the determination unit 33 determines that the driver has ignored the no-hand driving warning.

The determination unit 33 may determine whether all of the involvement requirements in the embodiment or modified examples are satisfied, or determine whether one or more of the involvement requirements are satisfied.

The computer program for achieving the functions of the processor 23 of the ECU 9 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:

1. A vehicle controller comprising:
 a memory configured to store a first map representing information on a road and a second map representing information on the road less accurately than the first map; and
 a processor configured to:
  determine whether an involvement requirement for requesting a driver of a vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a motion sensor configured to detect motion of the vehicle, or position of the vehicle, when the vehicle is under autonomous driving control, and
  give notification of a request for involvement in driving via a notification device provided in the interior of the vehicle when the involvement requirement is satisfied, wherein
 the processor makes the involvement requirement less strict when autonomous driving control of the vehicle is based on the second map than when autonomous driving control of the vehicle is based on the first map.

2. The vehicle controller according to claim 1, wherein the processor
 measures a lateral distance between a lane line demarcating a lane being traveled by the vehicle and the vehicle, based on the exterior sensor signal, and determines that the involvement requirement is satisfied, when the lateral distance falls below a predetermined distance threshold; and
 makes the predetermined distance threshold greater when autonomous driving control of the vehicle is based on the second map than when autonomous driving control of the vehicle is based on the first map.

3. The vehicle controller according to claim 2, wherein the processor increases the predetermined distance threshold as the degree of inconsistency between the information on the road represented in the first map and the information on the road represented in the second map increases in a section where autonomous driving control of the vehicle is based on the second map.

4. The vehicle controller according to claim 1, wherein the processor
 determines that the involvement requirement is satisfied, when speed of the vehicle indicated by the vehicle motion signal is greater than a regulation speed of a road being traveled by the vehicle by more than a predetermined speed threshold; and sets the predetermined speed threshold to a lower value when autonomous driving control of the vehicle is based on the second map than when autonomous driving control of the vehicle is based on the first map.

5. The vehicle controller according to claim 1, wherein the processor determines that the involvement requirement is satisfied, when a regulation speed of a road being traveled by the vehicle is less than a predetermined speed; and sets the predetermined speed to a higher value when autonomous driving control of the vehicle is based on the second map than when autonomous driving control of the vehicle is based on the first map.

6. The vehicle controller according to claim 1, wherein the processor determines that the involvement requirement is satisfied, when radius of curvature of a curve in a section being traveled by the vehicle or extending to a predetermined distance away is less than a predetermined curvature radius threshold; and sets the predetermined curvature radius threshold to a higher value when autonomous driving control of the vehicle is based on the second map than when autonomous driving control of the vehicle is based on the first map.

7. The vehicle controller according to claim 1, wherein the processor determines that the involvement requirement is satisfied, when gradient of a road in a section being traveled by the vehicle or extending to a predetermined distance away is not less than a predetermined gradient threshold; and sets the predetermined gradient threshold to a lower value when autonomous driving control of the vehicle is based on the second map than when autonomous driving control of the vehicle is based on the first map.

8. A method for vehicle control, comprising:

determining whether an involvement requirement for requesting a driver of a vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a motion sensor configured to detect motion of the vehicle, or position of the vehicle, when the vehicle is under autonomous driving control; and giving notification of a request for involvement in driving via a notification device provided in the interior of the vehicle when the involvement requirement is satisfied, wherein determining whether the involvement requirement is satisfied comprises making the involvement requirement stricter when autonomous driving control of the vehicle is based on a first map representing information on a road than when autonomous driving control of the vehicle is based on a second map representing information on the road less accurately than the first map.

9. A non-transitory recording medium that stores a computer program for vehicle control, the computer program causing a processor mounted on a vehicle to execute a process comprising:

determining whether an involvement requirement for requesting a driver of the vehicle to be involved in driving the vehicle is satisfied, based on an exterior sensor signal generated by an exterior sensor configured to detect conditions around the vehicle, an interior sensor signal generated by an interior sensor configured to detect conditions in an interior of the vehicle, a vehicle motion signal generated by a motion sensor configured to detect motion of the vehicle, or position of the vehicle, when the vehicle is under autonomous driving control; and giving notification of a request for involvement in driving via a notification device provided in the interior of the vehicle when the involvement requirement is satisfied, wherein determining whether the involvement requirement is satisfied comprises making the involvement requirement stricter when autonomous driving control of the vehicle is based on a first map representing information on a road than when autonomous driving control of the vehicle is based on a second map representing information on the road less accurately than the first map.

* * * * *